Feb. 8, 1949.  W. L. MOREY ET AL  2,460,841
PROJECTION AND PLOTTING DEVICE
Filed March 15, 1945  5 Sheets-Sheet 2
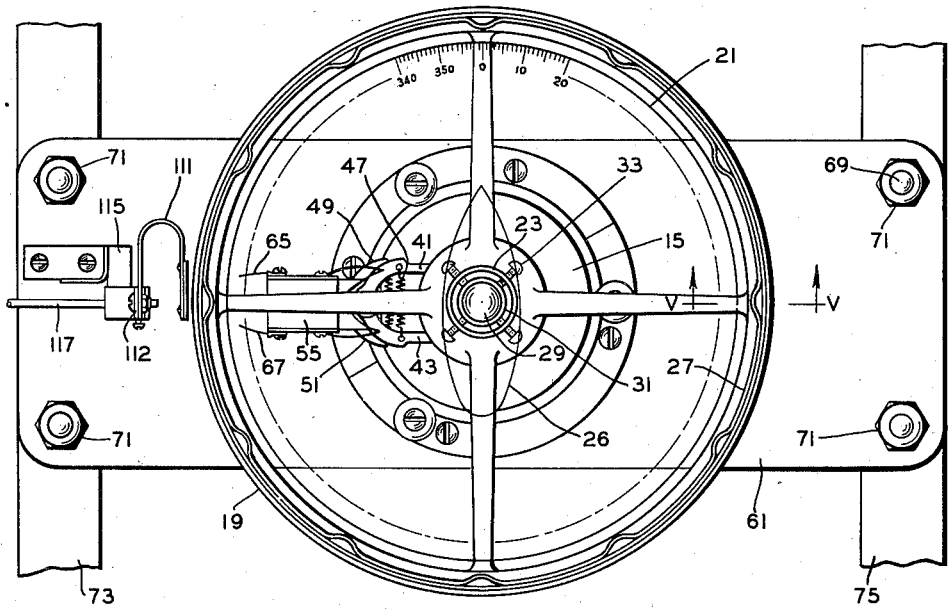
FIG. 3.
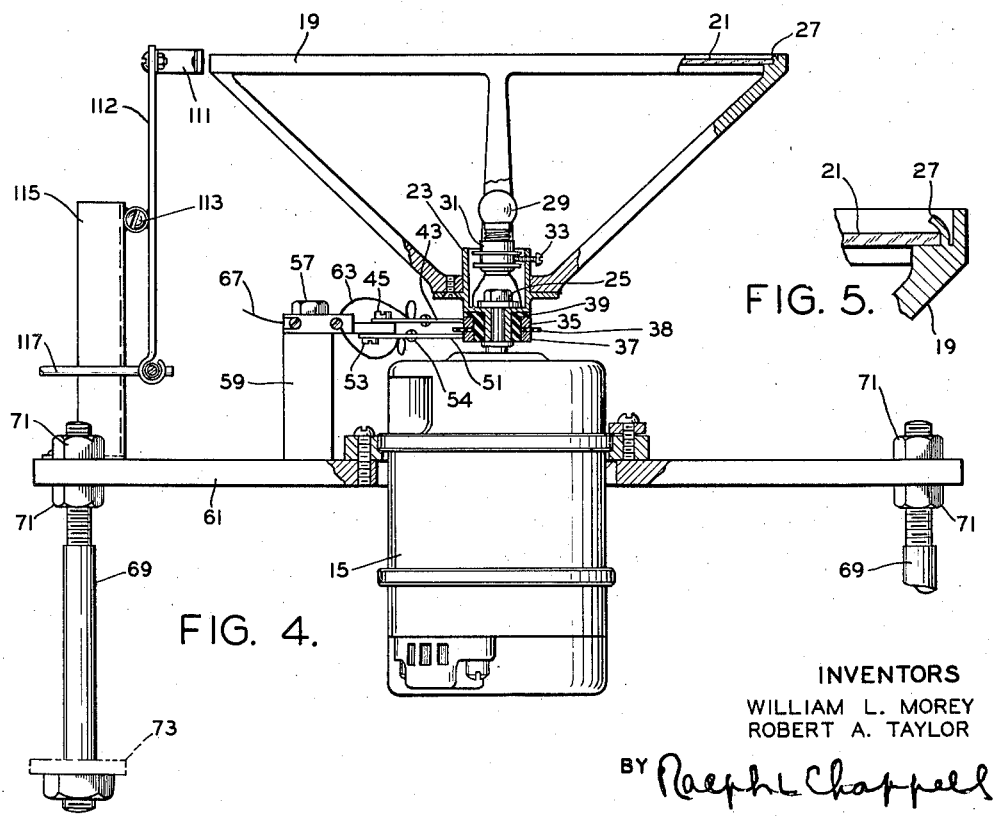
FIG. 4.
FIG. 5.
INVENTORS
WILLIAM L. MOREY
ROBERT A. TAYLOR
BY Ralph L Chappell
ATTORNEY Feb. 8, 1949. W. L. MOREY ET AL 2,460,841
PROJECTION AND PLOTTING DEVICE
Filed March 15, 1945 5 Sheets-Sheet 3

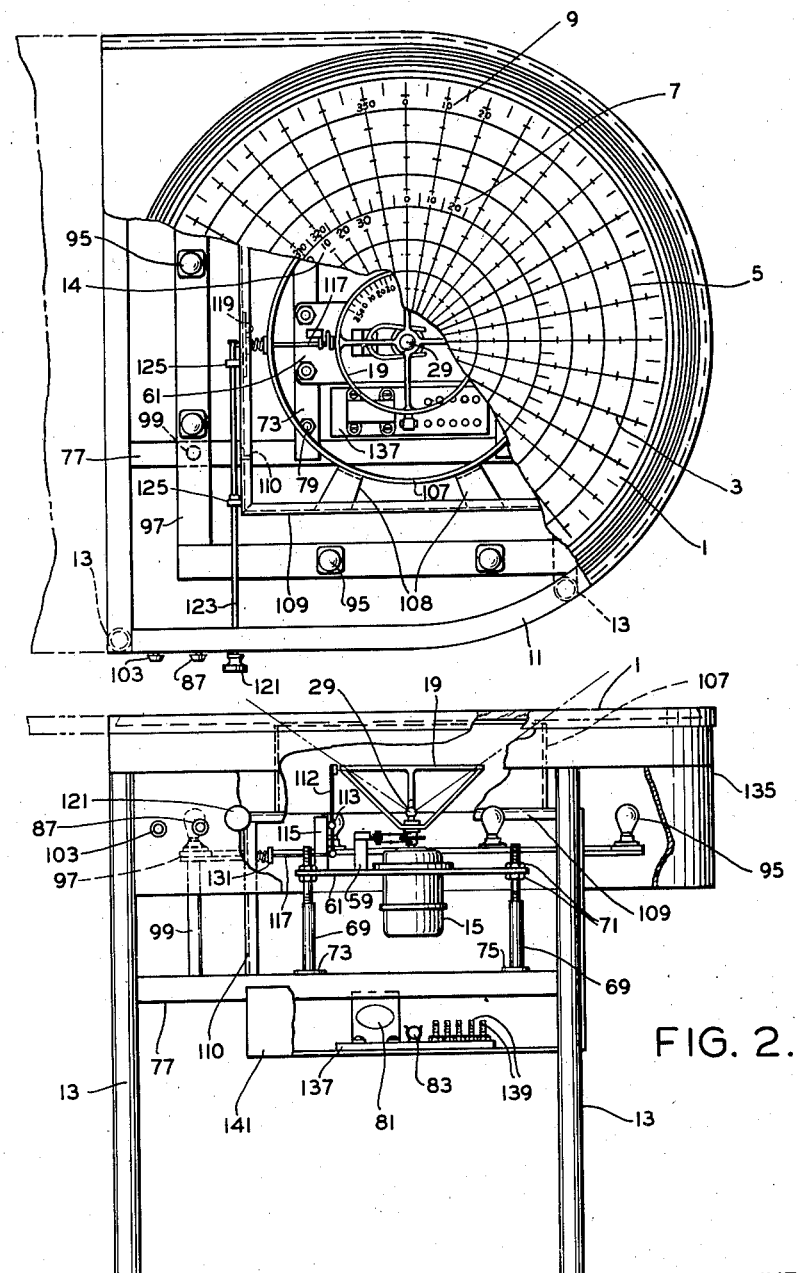

INVENTORS
WILLIAM L. MOREY
ROBERT A. TAYLOR
BY Ralph L Chappell
ATTORNEY

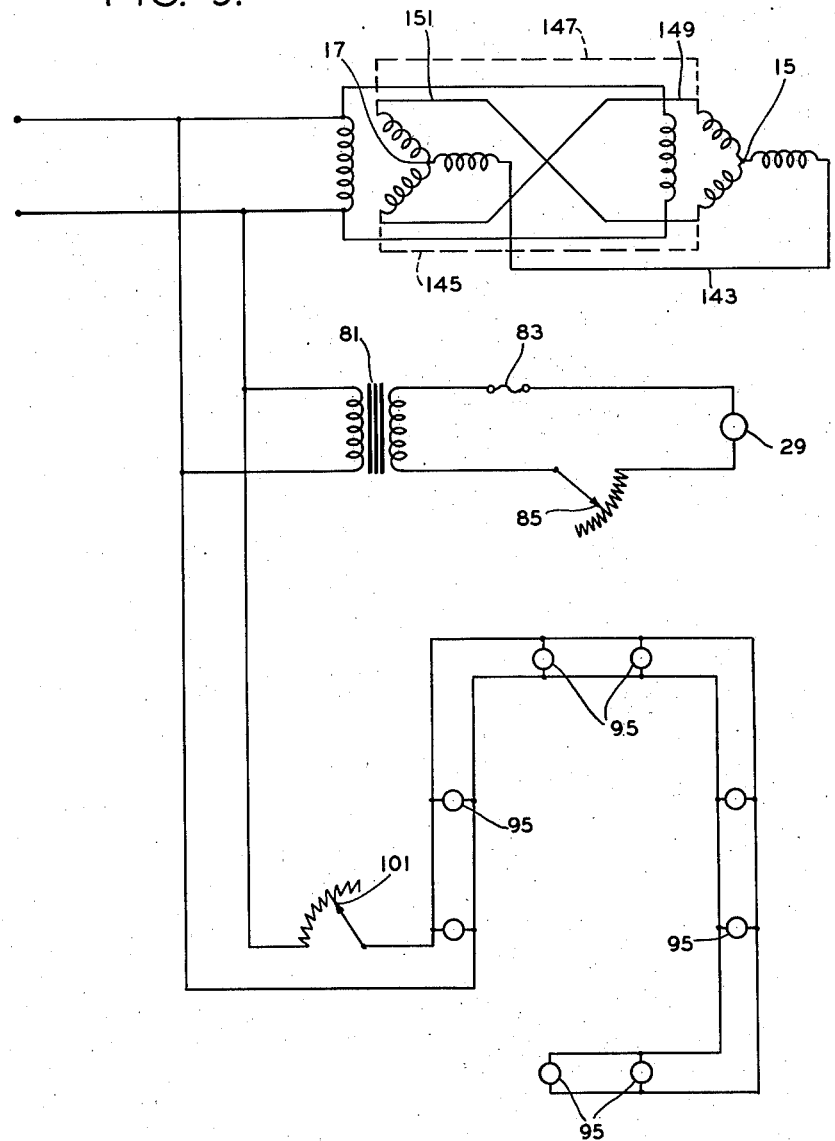

Feb. 8, 1949.  W. L. MOREY ET AL  2,460,841
PROJECTION AND PLOTTING DEVICE
Filed March 15, 1945  5 Sheets-Sheet 5
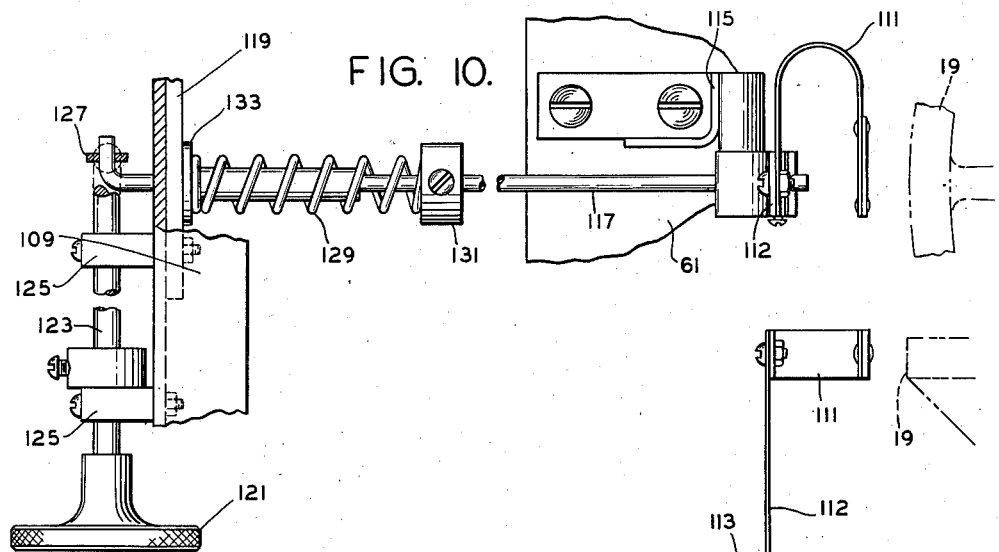
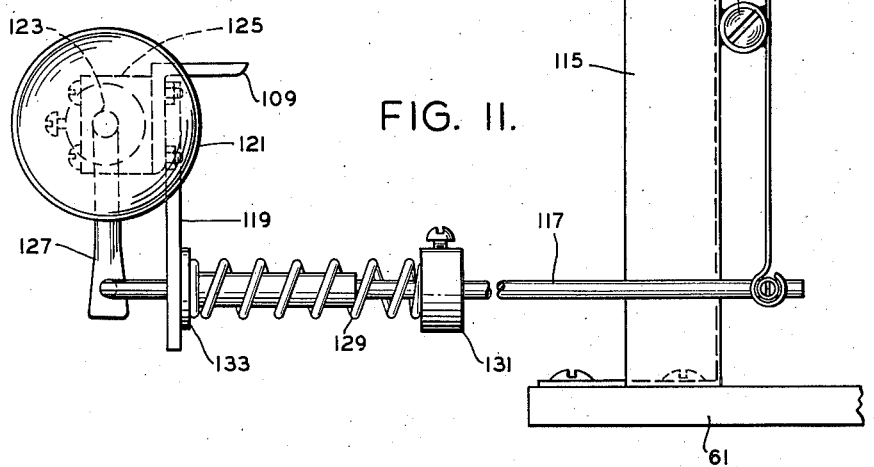
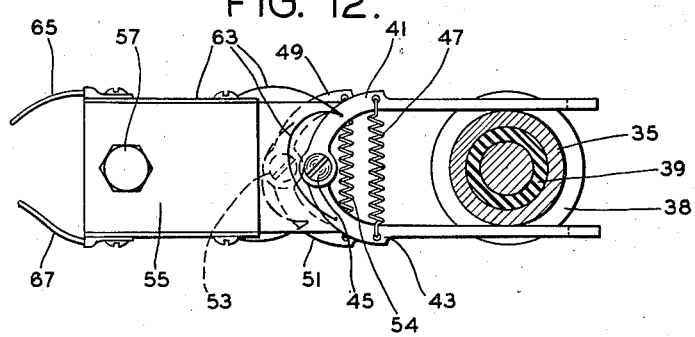
INVENTORS
WILLIAM L. MOREY
ROBERT A. TAYLOR
BY Ralph L. Chappell
ATTORNEY Patented Feb. 8, 1949

2,460,841

UNITED STATES PATENT OFFICE 2,460,841

PROJECTION AND PLOTTING DEVICE

William L. Morey, Melrose, and Robert A. Taylor, Newburyport, Mass.

Application March 15, 1945, Serial No. 582,963

7 Claims. (Cl. 88—24)

(Granted under the act of March 3, 1883, as amended April 30, 1928; 370 O. G. 757)

This invention relates to plotting devices and is illustrated herein as embodied in a plotting device of the maneuvering board type for determining aboard a ship, or any other craft, the position or movement relatively thereto of other objects.

An object to be plotted, such for example as an aircraft, another ship, a landmark, or navigational aid, is reported to the plotter in terms of its range and true bearing from the ship. For various reasons, the plotter is customarily stationed in a darkened compartment. Prior to my invention, the plotter recorded reports of the object and determined its position or movement on a maneuvering board sheet, viewed by reflected light, under unfavorably dim lighting conditions necessitated by other operations carried out in the same compartment. Moreover, the plotter is often required to report the bearing aspect of the maneuvering board solution as a relative bearing, i. e., a bearing from the ship's head. This entails converting a true bearing to a relative bearing by referring to a gyro-compass repeater or other compass located nearby, for the ship's true course, and applying this, in a manner well known to navigators, to the true bearing of the object to obtain its relative bearing.

With the foregoing in view, the present invention provides a plotting device in which a compass rose is projected in light and shade on an improved translucent plotting table or screen in exact coaxial relation to a polar coordinate system which is typical of a maneuvering board, all being clearly visible in a darkened space by dim, transmitted light. Owing to the further provision of a bearing scale on the screen, contiguous to the projected compass rose, and the fact that the latter is continuously oriented in accordance with the changes in the heading of the ship, four types of data are made available at all times, and are apparent on inspection once the position of the object has been indicated on the screen. This data comprises the range, the true and relative bearings of the object, and also the true course of the ship.

Invention is also to be recognized in various other features of the illustrated device, comprising a plotting table or screen on which any type of pencil or crayon may be used, means for illuminating the table, means for facilitating the proper orientation and stabilizing of the projected compass rose when the device is first put into operation, and electrical connections for insuring continuous illumination of the compass rose and a minimum of resistance to its turning.

With the above and other objects and features in view, the invention will now be described with reference to the accompanying drawings which illustrate a preferred embodiment of the invention and will be pointed out in the claims.

In the drawings:

Fig. 1 is a plan view of an illustrative plotting device embodying the invention, a part of the table being cut away to reveal the gyro-compass repeater assembly;

Fig. 2 is a front elevation of the plotting device, the apron being partly cut away to reveal the construction and arrangement of various internal parts;

Fig. 3 is an enlarged plan view of the gyro-compass repeater assembly;

Fig. 4 is a front elevation of the gyro-compass repeater assembly;

Fig. 5 is a sectional view illustrating the mounting of the compass card on its frame, the section being taken along the line V—V of Fig. 3;

Fig. 9 is a wiring diagram, showing the reversed connections between the Selsyn motor, which rotates the compass card, and the master gyro-compass system, and other electrical connections in the device;

Fig. 10 is a plan view of the hand-operated brake used to stabilize the compass card while the Selsyn system is being energized;

Fig. 11 is a front elevation of the brake shown in Fig. 10; and

Fig. 12 is an enlarged plan view, partly in section, of the brushes and slip-rings used to conduct electric current to the point source of light.

Figure 6:
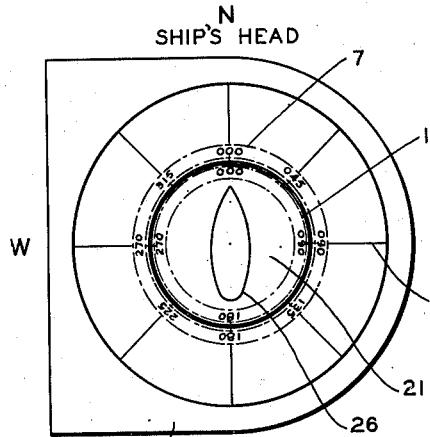
Fig. 6 and Fig. 7 are diagrammatical views of the device in plan showing the relative and true bearing scales as they appear when a ship carrying the device is on course 000° T. and 090° T., respectively.

The illustrated plotting device comprises a table 1 (Fig. 1), having indicated thereon a series of radial lines 3 and concentric circles 5, the lines and circles constituting a polar coordinate system typical of a maneuvering board form. Adjacent to an intermediate circle and an outer circle are bearing scales 7 and 9 respectively, which are graduated clockwise in degrees. The scale of the drawing necessitates showing the graduations in 5° increments. The table 1 is fixed to a U-shaped frame 11 which is supported at waist height on legs 13. The table is installed on ship board with the 0—0 radius of the table parallel to the longitudinal center line of the ship. To enable the device to be used in a darkened compartment, the table is under-lit by softened illumination, and plotting on the table is facilitated by projecting upwardly on it a compass rose 14, in light and shade, contiguous to the inner bearing scale 7.

The above-mentioned compass rose 14 is projected on the table in a predetermined angular relation with respect to the bearing scales 7 and 9, in accordance with the bearing of the ship's head, by a gyro-compass repeater assembly which will now be described. This assembly comprises a self-synchronous (Selsyn) motor 15 which is energized by a Selsyn generator 17 (Fig. 9) associated with the ship's master gyro-compass. A frame 19 (Fig. 4) which carries a transparent compass card 21 is mounted coaxially with the shaft of the motor 15 on a collar 23, the latter being secured to the motor-shaft under a washer and nut 25 which is threaded on the shaft. The compass card 21 is fully graduated clockwise in degrees as indicated in Fig. 3 and also has a ship's outline 26 indicated thereon to aid the plotter in visualizing the heading of the ship. The compass card 21 is secured in the frame 19 within a thin flange 27 which is integral with the frame and is crimped at several points around the periphery of the frame over the edge of the compass card as indicated in Fig. 5.

Light for projecting the compass rose 14 on the table is provided by a miniature incandescent lamp 29 having a filament so small as to provide substantially a point source of light. To permit the positioning of the lamp 29 so that its filament is coaxial with the motor 15 and the compass card 21, the lamp is mounted in a socket 31 which is adapted to be adjusted radially in any direction by adjusting screws 33, which are threaded in the collar 23 and are adapted to be received in a groove in the side of the socket.

In view of the small torque of a Selsyn motor and the necessity that the motor 15 shall respond to the slightest movement of the generator 17, it is essential that resistance to the rotation of the motor be minimized to the utmost. Accordingly, antifriction connections have been provided in the illustrated device for conducting electric current from the source to the lamp 29. These connections comprise slip rings 35 and 37 which are insulated from each other by an insulating washer 38 and are mounted on an insulating bushing 39 carried by the collar 23. As illustrated in Fig. 4, the slip rings are electrically connected by leads to the socket 31. Electric current is conducted to the slip ring 35 by a pair of brushes 41, 43 having a common pivot at 45 (Figs. 4 and 12) and which are adapted to be yieldingly held against the slip ring by a spring 47. The brushes are so thin as to provide substantially a knife-edge contact with the slip ring 35, whereby friction is minimized and insurance is provided against an open circuit caused by dirt. Moreover, the brushes 41 and 43 bear against opposite sides of the slip ring 35 with equal force, and hence no friction is set up in the motor-shaft bearings owing to the pressure of the brushes. A similar set of brushes 49, 51 are arranged to engage the slip ring 37, these brushes having a common pivot at 53 and are connected by a spring 54. Both pairs of brushes are mounted on a block of insulation 55 which is secured by a bolt 57 to a strut 59, the latter being fixed to a horizontal base plate 61 to which the motor 15 is also attached. The brushes 41 and 43 are electrically connected by leads 63 to a conductor 65 which is connected to the source of current. A second conductor 67 is similarly connected to both of the brushes 49 and 51.

The base plate 61 is supported on four rods 69 having nuts 71 threaded on their upper ends, by the adjustment of which nuts the plate 61 is secured in any desired position of adjustment heightwise with respect to the table 1. The rods 69 are carried by two bars 73 and 75 which are adapted to be supported by and clamped to a pair of hangers 77, 77 which are parts of a rectangular framework fixed to the legs 13. The bars 73, and hence the gyro-compass repeater unit, may be adjusted lengthwise and crosswise of the hanger 77 to permit the compass card 21 and motor 15 to be adjusted into coaxial relation with the polar coordinate system on the table 1. When so adjusted, the bars 73 are clamped in position by a series of bolts, one of which is indicated at 79 (Fig. 1).

A current of low voltage is supplied to the lamp 29 by a transformer 81 (Figs. 2 and 9), this circuit including a fuse 83 and a rheostat 85 which is operated by a control knob 87 at the front of the device.

Assuming now that the compass card 21 and lamp 29 are coaxial with the polar coordinate system, light from the lamp projects an image of the compass card in light and shade on the upper surface of the table 1. This image is the compass rose 14 (Fig. 8) which is inside of and in juxtaposition to the bearing scale 7, this latter relation being obtained by the proper heightwise adjustment of the plate 61 on the rods 69.

The illustrated table 1 (Fig. 8) is made of a set of tempered, non-shatterable glass, the bottom surface of which, throughout a circular area 89, within the conical projection of the compass card 21, is clear. The upper surface of the table 1 is in effect, a screen, adapted to display the projected compass rose 14 to an observer above the table, and is constituted in the illustrated table by a translucent layer of fused ceramic material. This layer comprises a circular portion 91 (Fig. 8) which is more dense than the remaining annular area 93, the circular area terminating within the space occupied by the projected compass rose 14. This top translucent layer is inseparably fused to the glass of the table and has abrasive particles embedded therein to facilitate plotting with any type of pencil or crayon. It will be understood from Fig. 8 that the circular area of the table 1, including and inside of the bearing scale 7, is illuminated by the lamp 29.

Figure 8:
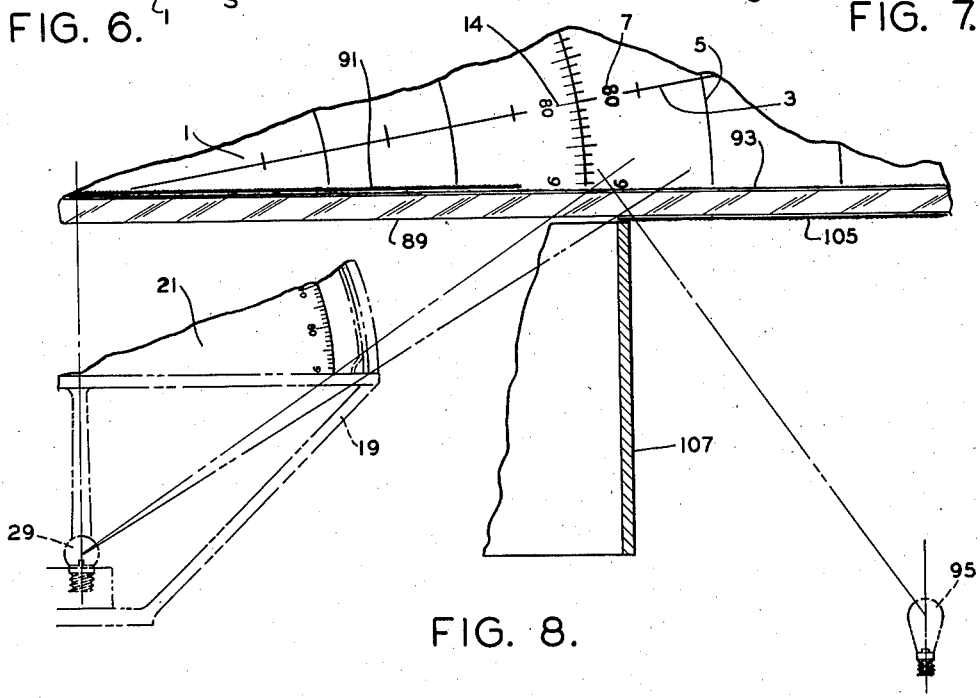
Fig. 8 is a diagrammatical view, partly in plan and partly in section, illustrating the projection of an image of the compass card on the table, and certain illumination features.

The annular area of the table outside of the last-mentioned area is under-lit by a plurality of lamps 95 which are mounted on a rectangular framework 97 (Fig. 1), the latter being supported by struts 99 which are fixed to the hangers 77. The intensity of the light from the lamps 95 is controlled by a rheostat 101 (Fig. 9) which is operated by a control knob 103 (Figs. 1 and 2) at the front of the device. Light from the lamps 95 is diffused on striking the table 1 by an annular translucent layer 105 (Fig. 8) of ceramic material which is fused to the bottom surface of the table. This light is prevented from illuminating the bearing scale 7 and projected compass rose 14, as well as the central circular area of the table inside of the latter, by a cylindrical hood 107, the top edge of which is closely adjacent to the lower surface of the table as illustrated in Fig. 8. The hood is thus supported by lugs 108 (Fig. 1) on a rectangular frame 109, having legs 110, the lower ends of which are fixed to the hangers 77.

When a Selsyn generator-motor system is energized, the motor, as is well known in this art, "hunts" until it comes to rest at electrical zero. Motors of this type commonly have embodied therein an inertia damping device for minimizing the period of hunting. The value of the illustrated device would be lost if the operator had to wait the usual amount of time required for the motor to reach electrical zero upon being energized. Furthermore, this period is increased somewhat in the illustrated device, as compared with that of a normal motor, owing to the inertia of the frame 19 and the other parts of the device associated therewith. Accordingly, the device is provided with operator controlled means, which will now be described, for holding or stabilizing the motor 15 at electrical zero when the Selsyn system is energized.

This means comprises a brake having a resilient leather-faced shoe 111 which is adapted to engage the rim of the frame 19. The shoe is fixed to a lever 112, the latter being pivoted at 113 to a strut 115 which is fixed to the base plate 61.

The lever 112 is operated by a rod 117, the left-hand end of which slides in and is supported by a bracket 119 (Fig. 1) which extends downwardly from the frame 109. The rod 117 is moved to the left (Figs. 10 and 11) to bring the shoe 111 into contact with the frame 19 by turning a knob 121 in a clockwise direction. The knob is mounted at the front of the device on a shaft 123, the latter being mounted to rotate freely in bearing blocks 125 fixed to the bracket 119. The inner end of the shaft 123 is bent downwardly to provide a crank 127 to which the rod 117 is connected. The shoe 111 is normally held away from the frame 19 by a spring 129, one end of which bears against a collar 131 which is clamped to the rod 117, the other end of the spring being seated on a thimble 133 which abuts the bracket 119.

An apron 135 (Fig. 2) which extends well below the lamps 95 is fixed to the frame 11 and surrounds the entire device for the purpose of preventing the lamps 95 from excessively illuminating the space in which the device is used.

The transformer 81 and fuse 83 are mounted on a panel 137 which also carries a series of terminals 139 to which leads are connected for completing the electric circuits indicated in Fig. 9. The panel 137 is supported by a bracket 141 which is fixed to the forward hanger 77.

In the usual application of a Selsyn motor-generator system to a master compass and a repeater, similar terminals of the motor and generator are connected to each other. Accordingly, when a ship having such an installation changes course in one direction, the dials or cards of the master compass and the repeater, both turn with respect to the ship in the opposite direction but to the same extent; and the orientation of both cards relatively to the earth remains unchanged. If the Selsyn motor 15 and generator 17 were thus arranged in the present device, they would be connected by leads 143 (Fig. 9), 145, and 147. However, the usual arrangement of the dotted leads 145 and 147 is reversed in the illustrated device, in which the leads 149 and 151 take the place of the usual leads 145 and 147 respectively. The effect and purpose of these electrical connections between the motor 15 and generator 17 will now be described with reference to Figs. 6 and 7.

Figure 7:
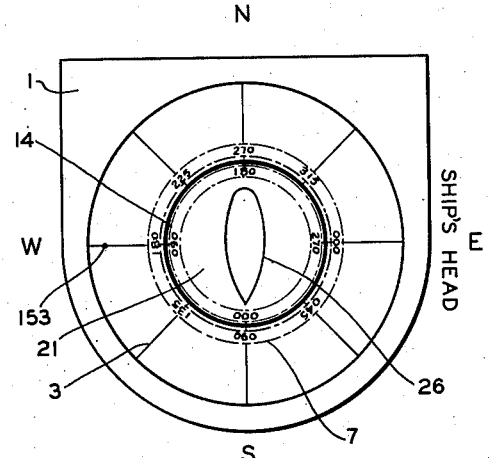

In both of these figures, true north, east, south and west are represented by the letters N, E, S, and W. The table 1 is indicated with a few of its radial lines 3 and its bearing scale 7. Inside of and adjacent to the latter is indicated the projected compass rose 14. On a ship heading true N, the 000 graduations on the compass rose 14 and bearing scale 7 would be in alignment. Assume now that the ship turns 90° to the right, and that the ship's head bears true E, as indicated in Fig. 7. During this movement of the ship, the dial or card of the master gyro-compass rotated relatively to the ship, 90° counterclockwise. However, owing to the reversal of the leads described above between the motor 15 and the generator 17, the compass rose 14 is rotated 90° clockwise relatively to the ship. Accordingly, with any change of heading of the ship the compass rose 14 rotates in the same direction but with twice the angular velocity of the ship. Thus the course or heading of the ship is indicated at all times on the scale 7 opposite to the 000 graduation on the compass rose 14. Similarly, any object bearing true E from the ship which would be plotted on the table 1 along that radial line 3 marked 090°, would be indicated on inspection by the compass rose 14 as bearing 000° relatively to the ship's head. Further to illustrate the use of the device, assume the ship to be on the same heading as before and that an object is predicted by the solution of a maneuvering board problem to be at the point 153 at a predetermined time. As soon as the above solution is reached, it is apparent from inspection that at the pre-determined time, the object will bear 180° true (from the scale 7) and will bear 090° (from the compass rose 14) relatively to the ship's head. Thus, once the position of an object relatively to the ship is indicated on the table 1, its true and relative bearing may be read immediately from the scale 7 and compass rose 14 respectively. Hence, a plotting problem can be carried out continuously, notwithstanding changes in the ship's course, without angularly shifting the problem on the plotting table.

The adjustment and operation of the illustrated device will now be briefly summarized. The gyro-repeater assembly is first adjusted so that the compass rose 14 is projected coaxially with the polar coordinate system, with the graduations of the rose 14 contiguous to the bearing scale 7, as illustrated in Fig. 8. To effect this result, the lamp 29 is adjusted radially of the collar 23 to bring the filament of the lamp into coincidence with the common axis of the compass card 21 and the frame 19. The base plate 61 is adjusted heightwise of the rod 69 to make the axis of the frame 19 perpendicular to the coordinate system. It is also by this adjustment that the outside diameter of the compass rose 14 is made substantially equal to the inside diameter of the bearing scale 7. The bars 73, 73 are next slid lengthwise or crosswise of the hanger 77, as may be necessary, to bring the axis of the frame 19 in coincidence with the origin of the polar coordinate system on the table. The gyro-compass repeater assembly is then clamped in this position by setting up the bolts 79.

When the Selsyn motor generator system is energized, the operator turns the knob 121 so as to hold the brake shoe 111 lightly against the frame 19. Thereafter, the shoe is intermittently released from the frame 19 to allow it slowly to approach a position corresponding to that of the master compass dial or card. If desired, the frame 19 may be rotated into the proper position by hand and then be held in this position by the brake shoe 111 while the Selsyn motor system is being energized. By the use of either of these methods, the compass rose 14 may be very quickly stabilized into a position corresponding to that of the master compass card or dial.

By adjusting the knobs 87 and 103, the illumination of the inner circular and outer annular areas of the table 1 may be balanced and dimmed to provide the most favorable lighting conditions.

The invention described herein may be manufactured and used by or for the Government of the United States of America for governmental purposes without the payment of any royalty thereon or therefor.

Having described our invention what we claim as novel and desire to protect by Letters Patent of the United States is:

1. A plotting device adapted for use in connection with a master gyroscopic compass having, in combination, a translucent screen having thereon a polar coordinate system graduated clockwise from the ship's head, means for projecting a compass rose in light and shade on said screen coaxially with said system, and means actuated by said master compass for rotating said last mentioned means in the same direction as but at double the angular velocity of said screen when a craft carrying said plotting device turns, whereby the graduations of said system represent true bearings, true courses are indicated by said system opposite to the zero of said rose, and relative bearings are indicated on said rose opposite to true bearings on said system.

2. A plotting device adapted for use in connection with a master gyroscopic compass having, in combination, a translucent screen having thereon a polar coordinate system graduated clockwise from the ship's head, means for projecting a compass rose in light and shade on said screen coaxially with said system, and a self-synchronous motor for rotating said last mentioned means, said motor being electrically connected to the synchro-signal generator of said master gyroscopic compass in such manner as to rotate the same amount as but in the opposite direction to said generator.

3. A plotting device adapted for use in connection with a master gyroscopic compass having, in combination, a translucent screen having thereon a polar coordinate system, means for projecting a compass rose in light and shade on said screen coaxially with said system, a self-synchronous motor for rotating said last mentioned means, said motor being electrically connected to the synchro-generator of said master gyroscopic compass, and operator controlled means for releasably holding said motor stationary in the position of electrical zero, whereby oscillation of said motor is minimized when said motor is energized.

4. In a plotting device, in combination, a transparent table having a polar coordinate system indicated thereon and a bearing scale concentric therewith, a layer of translucent material on the top surface, said layer having a central circular portion within said scale denser than the remainder thereof, an annular layer of translucent material on the bottom surface concentric with but outside of said scale, a direction indicator comprising a compass rose and point source of light in spaced coaxial relation with said system, said point source being constructed and arranged to project a magnified image in light and shade of said rose on said table coaxially and contiguous with said scale and simultaneously to illuminate said table, a rotatable frame supporting said rose, a self-synchronous motor on the shaft of which said frame is mounted, a general source of light beneath said table arranged to illuminate said table by transmitting light, and a shield positioned between said general source of light and said direction indicator, adjacent to the bottom surface of said table at the inner boundary of said annular layer, whereby light from said general source is restrained from falling upon said image and scale.

5. A plotting device adapted for use with a compass having, in combination, a screen having thereon a polar coordinate system graduated from a predetermined reference bearing, means for projecting a compass rose on said screen coaxially with said system, and means actuated by said compass for rotating said last-mentioned means in the same direction but at double the angular velocity of said screen when said plotting device is turned, whereby the graduations of said polar coordinate systems represent true bearings.

6. A plotting device adapted for use with a compass having, in combination, a translucent screen having a polar coordinate system thereon graduated from a predetermined reference bearing, means for projecting the image of a compass rose on the central portion of said screen coaxially with said system, means for under-lighting the remainder of said screen, means for excluding said under-lighting from that portion of said screen within said image, and means actuated by said compass for rotating said projection means in the same direction but at double the angular velocity of said screen when said plotting device is turned.

7. A plotting device adapted for use with a compass having in combination, a screen, means for projecting a compass rose on said screen, and means actuated by said compass for rotating said last-mentioned means at double the angular velocity of said screen when said plotting device is turned.

WILLIAM L. MOREY.
ROBERT A. TAYLOR.

REFERENCES CITED

The following references are of record in the file of this patent:

UNITED STATES PATENTS

| Number | Name | Date |
|---|---|---|
| 320,823 | Sleater | June 23, 1885 |
| 984,929 | Kellner | Feb. 21, 1911 |
| 1,215,425 | Sperry | Feb. 13, 1917 |
| 1,228,685 | Magowan | June 5, 1917 |
| 1,285,279 | McCabe | Nov. 19, 1918 |
| 1,334,145 | Eaton | Mar. 16, 1920 |
| 1,550,174 | Le Prieur | Aug. 18, 1925 |
| 1,705,951 | Wright | Mar. 19, 1929 |
| 1,949,422 | Karnes | Mar. 6, 1934 |
| 2,181,134 | Katz | Nov. 28, 1939 |
| 2,222,414 | Kudar | Nov. 19, 1940 |

FOREIGN PATENTS

| Number | Country | Date |
|---|---|---|
| 726,342 | France | Feb. 29, 1932 |
| 316,569 | Great Britain | Feb. 26, 1929 |
| 773,083 | France | Aug. 25, 1934 |